US008824486B2

(12) United States Patent
June et al.

(10) Patent No.: US 8,824,486 B2
(45) Date of Patent: Sep. 2, 2014

(54) NETWORK RE-ROUTING SYSTEMS AND METHODS

(75) Inventors: Thaddeus O. June, Stone Mountain, GA (US); Duane Hattaway, Dahlonega, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 2871 days.

(21) Appl. No.: 11/025,275

(22) Filed: Dec. 29, 2004

(65) Prior Publication Data

US 2006/0140383 A1 Jun. 29, 2006

(51) Int. Cl.
*H04L 12/28* (2006.01)
*H04L 12/56* (2006.01)
*H04L 12/54* (2013.01)

(52) U.S. Cl.
CPC .......... *H04L 49/255* (2013.01); *H04L 12/5601* (2013.01)
USPC ............................ 370/396; 370/401; 370/352

(58) Field of Classification Search
CPC .............. H04L 49/255; H04L 12/5601; H04L 2012/5609
USPC ......... 379/201.01, 221.1, 230, 32.04, 221.01; 709/238; 370/216–235.1, 236, 353, 370/351, 396, 401, 352, 410
See application file for complete search history.

(56) References Cited

U.S. PATENT DOCUMENTS

| | | | | |
|---|---|---|---|---|
| 5,708,702 A * | 1/1998 | De Paul et al. | ............. | 379/221.1 |
| 5,764,920 A * | 6/1998 | Cook et al. | ..................... | 709/238 |
| 5,793,853 A * | 8/1998 | Sbisa | ............................ | 379/120 |
| 5,802,144 A * | 9/1998 | Laird et al. | ................. | 379/32.04 |
| 5,848,140 A * | 12/1998 | Foladare et al. | ......... | 379/201.01 |
| 6,137,800 A * | 10/2000 | Wiley et al. | .............. | 370/395.51 |
| 6,195,425 B1 * | 2/2001 | Farris | ............................ | 379/230 |
| 6,292,552 B1 * | 9/2001 | Plunkett et al. | .......... | 379/221.01 |
| 6,363,080 B1 * | 3/2002 | Katko | ........................... | 370/466 |
| 6,470,018 B1 * | 10/2002 | Wiley et al. | .................... | 370/396 |
| 6,526,136 B2 * | 2/2003 | Plunkett et al. | .......... | 379/221.02 |
| 6,882,766 B1 * | 4/2005 | Corbalis et al. | ................. | 385/16 |
| 6,885,671 B1 * | 4/2005 | Wiley et al. | .................... | 370/410 |
| 6,973,267 B1 * | 12/2005 | Arecco et al. | ....................... | 398/4 |
| 7,039,173 B2 * | 5/2006 | Tuunanen | ................ | 379/221.12 |
| 7,350,099 B2 * | 3/2008 | Taylor et al. | ....................... | 714/4 |
| 2005/0163110 A1 * | 7/2005 | Howell | ......................... | 370/352 |

* cited by examiner

*Primary Examiner* — Chuong T Ho
(74) *Attorney, Agent, or Firm* — Hanley, Flight & Zimmerman, LLC

(57) ABSTRACT

A telecommunications system includes a local data switch in communication with a first interexchange carrier network and a customer computer in communication with the local data switch. When there is a disruption in a first interexchange carrier network, the customer computer can reconfigure the local data switch from a customer facility such that data traffic to and from the customer facility is rerouted from the first interexchange carrier network to a second interexchange carrier network.

10 Claims, 2 Drawing Sheets

NETWORK RE-ROUTING SYSTEMS AND METHODS

BACKGROUND

Embodiments of the present invention relate generally to network re-routing and more particularly to customer-facility-managed network re-routing.

Telecommunications providers within a local access and transport area (LATA) often provide data communication and networking services to their customers. Such providers provide switches (e.g., frame relay switches, ATM switches, etc.) within the LATA and provide access to interexchange (IXC) carrier networks for data transmission between LATAs, including LATAs serviced by the same telecommunications provider. When a customer of the telecommunications provider encounters a problem with data transmission and the problem is not a problem with the provider's network (e.g., a problem with the IXC carrier's network), the customer oftentimes has to request that the provider reconfigure the logical connections at its switches to bypass the problem network. It often takes time for the provider to reconfigure the connections at its switches and, thus, data transmission for its customers may be disrupted for a longer period of time than is desirable.

SUMMARY

In various embodiments, the present invention is directed to a telecommunications system. The system includes a local data switch in communication with a first interexchange carrier network and a customer computer in communication with the local data switch, wherein a user of the customer computer can reconfigure the local data switch from a customer facility such that data traffic to and from the customer facility is rerouted from the first interexchange carrier network to a second interexchange carrier network.

In various embodiments, the present invention is directed to a method of rerouting data traffic. The method includes a means of reconfiguration a customer computer in communication with a local data switch, a path of the data communications when the service disruption is in the first interexchange carrier network.

In various embodiments, the present invention is directed to a system. The system includes a means of customer reconfiguration in communication with a local data switch for reconfiguring a path of the data communications when the service disruption is in the first interexchange carrier network.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Advantages of the invention may be better understood by referring to the following description taken in conjunction with the accompanying drawings, in which.

DESCRIPTION

Figure 1:
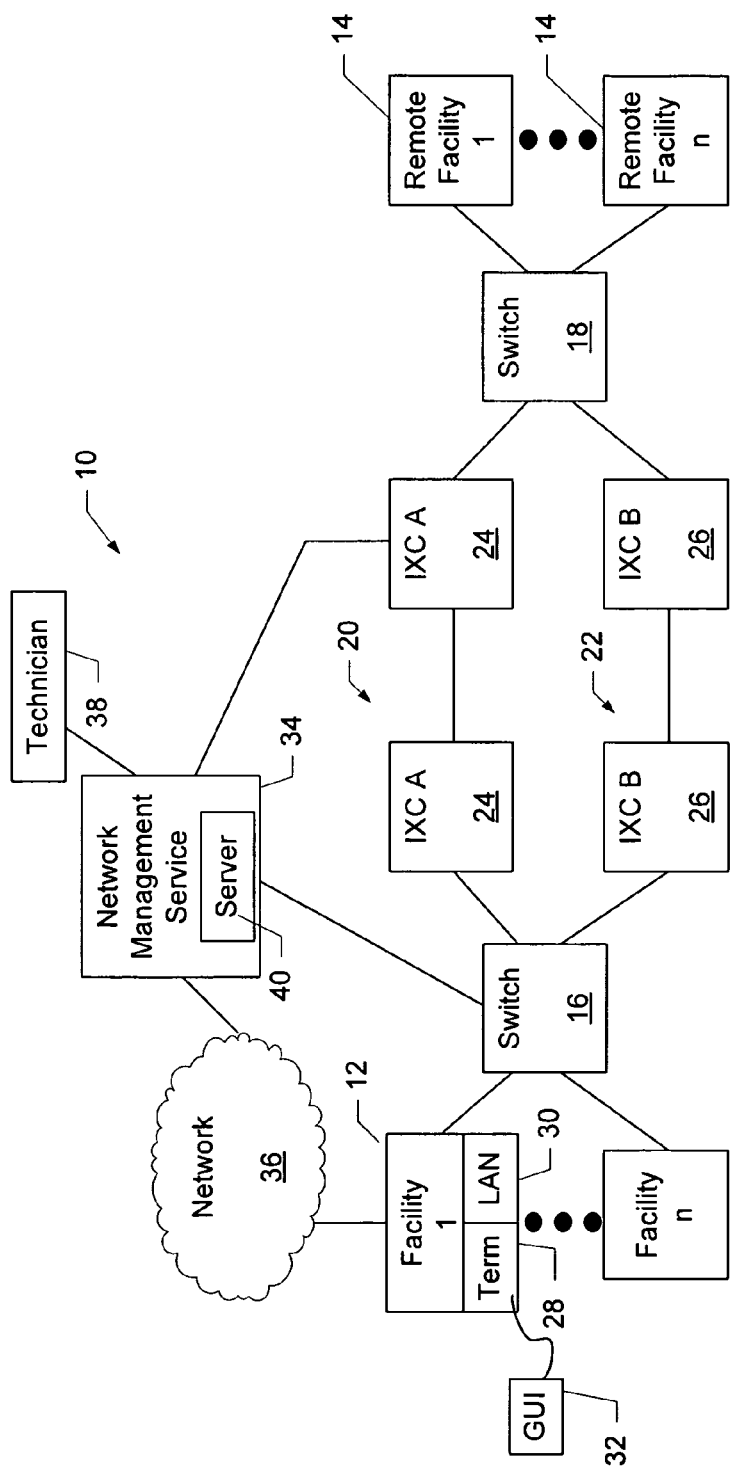
FIG. 1 illustrates an embodiment of a system.

Turning now to the drawings, wherein like reference numerals refer to like elements, the various embodiments of the invention are illustrated as being implemented in a suitable general-purpose environment.

FIG. 1 illustrates an embodiment of a system 10. The system 10 includes a number of facilities 12 that are located at, for example, a first geographical area. The system 10 also includes a number of remote facilities 14 that are located at, for example, a second geographical area. By way of illustration, the facilities 12, 14 may be retail stores, bank branch offices, etc. owned by an organization that desires to link that the facilities 12, 14 for data exchange and communication purposes. The first geographical area at which the facilities 12 are located may be, for example, a first city, state, etc. and the second geographical area at which the facilities 14 are located may be, for example, a second city, state, etc. that is located remotely from the first city or state.

The facilities 12 are in communication with a telecommunications switch 16 and the facilities 14 are in communication with a telecommunications switch 18. The switches 16, 18 may be, for example, frame relay switches or ATM switches located in, for example, central offices of a LATA telecommunications provider. Because the switches 16, 18 are located in diverse geographical areas (e.g., different LATAs), interexchange carrier (IXC) networks 20, 22 connect the switches 16, 18. The IXC networks 20, 22 may be owned and/or operated by different interexchange carriers. The IXC networks 20, 22 include IXC switches 24, 26.

Each facility 12, 14 includes user terminals 28 that may be, for example, personal computers or any type of computing device that are networked via a local area network (LAN) 30. The user terminals 28 have local or client access to a graphical user interface (GUI) 32 that facilitates a user of each of the terminals 28 to use a customer network management application. The facilities 12 are in communication with a customer network management service (CNMS) 34 via a network 36. The network 36 may be, for example, the Internet. The CNMS 34 allows a user of the user terminal 28 or a technician 38 to perform operations on the switches 16, 18. Such operations include adding, changing, or deleting permanent virtual circuit (PVC) configurations at the switches 16, 18. In one embodiment, a user at the facility 12 uses the terminal 28 to access a server 40 at the CNMS 34. The server 40 allows the user to thus view and configure the PVC configurations relating to the facilities 12, 14 at the switches 16, 18 using the GUI 32. In another embodiment, reconfiguration may be carried out automatically at the customer facilities 12, with or without communication with the server 40.

In operation, the system 10 allows a user at one of the facilities 12, 14 to reconfigure and redistribute its PVC connections. Thus if, for example, one of the interexchange networks 20, 22 becomes inoperative due to, for example, a cable cut, the user may switch its data traffic to the other functioning interexchange network without waiting for the technician 38 to reroute the traffic.

Figure 2:
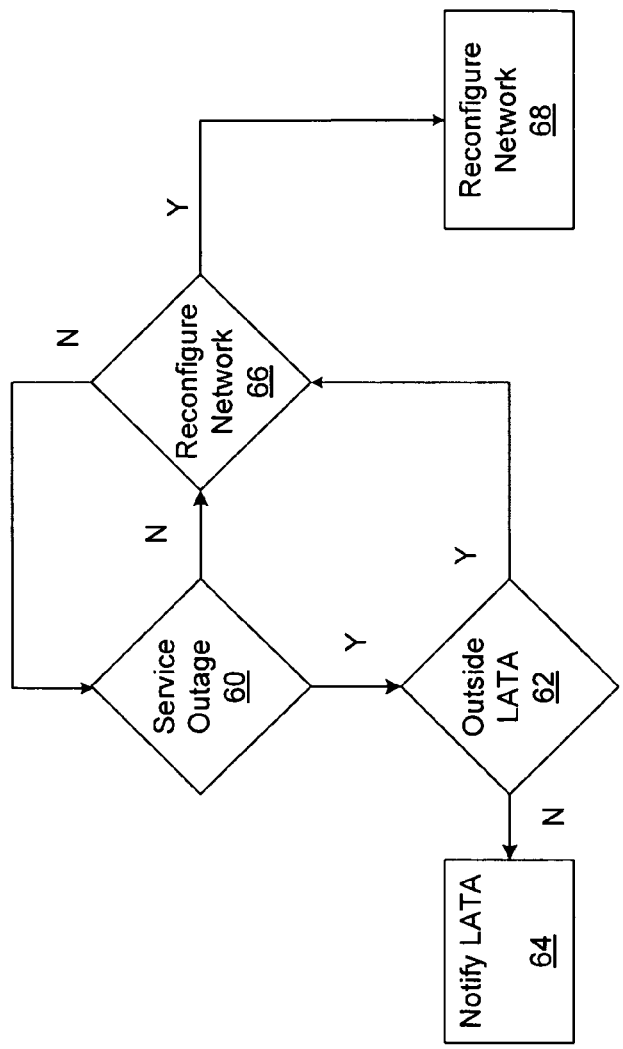
FIG. 2 illustrates an embodiment of a process flow through the system of FIG. 1.

FIG. 2 illustrates an embodiment of a process flow through the system 10 of FIG. 1. At step 60, it is determined whether there is a service outage in the system 10 as it relates to the facilities 12, 14. The determination may be made by, for example, an indication at one or more of the facilities 12, 14 that data transmissions or access to system resources are not happening as requested. At step 62, if there is an outage it is determined whether the outage is outside the LATA (i.e., in the interexchange networks 20, 22). If the outage is not outside the LATA, the LATA provider is notified at step 64 of the outage.

If there was no service outage as determined at step 60 or if an outage is outside the LATA as determined at step 62, the user may elect to reconfigure the network at step 66. For example, a user may desire to eliminate transmissions through interexchange network 20 because of, for example, a contractual issue involving the interexchange carrier that owns and/or administers the network 20, because the network 20 is out of service, or part of routine configurations. If the user desires to reconfigure the network, the user may do so at step 68. The reconfiguration made at step 68 may be indefinite in duration or may be set to return to a prior configuration after a predetermined period of time.

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

What is claimed is:

1. A telecommunications system, comprising:
   a customer computer in communication with a local data switch in communication with a first interexchange carrier network and a second interexchange carrier network, the local data switch including a first configuration associated with a first communication path between the customer computer and the first interexchange carrier, the local data switch including a second configuration associated with a second communication path between the customer computer and the second interexchange carrier; and
   a customer network management application configured to enable a user of the customer computer to change the local data switch from operating according to the first configuration to operating according to the second configuration, and wherein the local data switch is configured to return to operating according to the first configuration after a predetermined period of time.

2. The system of claim 1, wherein the local data switch is one of a frame relay switch and an ATM switch.

3. The system of claim 1, wherein the customer computer is in communication with the local data switch via a customer network management service center.

4. The system of claim 1, wherein the customer computer is in communication with the local data switch via the Internet.

5. The system of claim 1, wherein the customer computer is in communication with a server at a customer network management service center.

6. The system of claim 1, wherein the customer computer includes a graphical user interface that facilitates the customer network management application.

7. The system of claim 6, wherein the graphical user interface facilitates the change of the local data switch from operating according to the first configuration to operating according to the second configuration.

8. The system of claim 1, wherein each of the first and second interexchange carrier networks include an interexchange switch.

9. The system of claim 1, further comprising a second local data switch located remotely from the local data switch and in communication with the first and second interexchange carrier networks.

10. The system of claim 1, the customer computer being located at least one of a private residence or business.

* * * * *